No. 627,638. Patented June 27, 1899.
J. A. BIRSFIELD.
FOLDING MINE TRANSIT.
(Application filed Feb. 2, 1899.)
(No Model.)
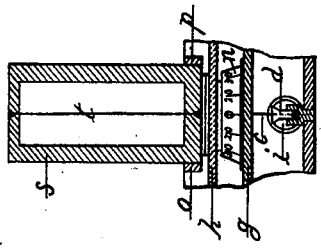
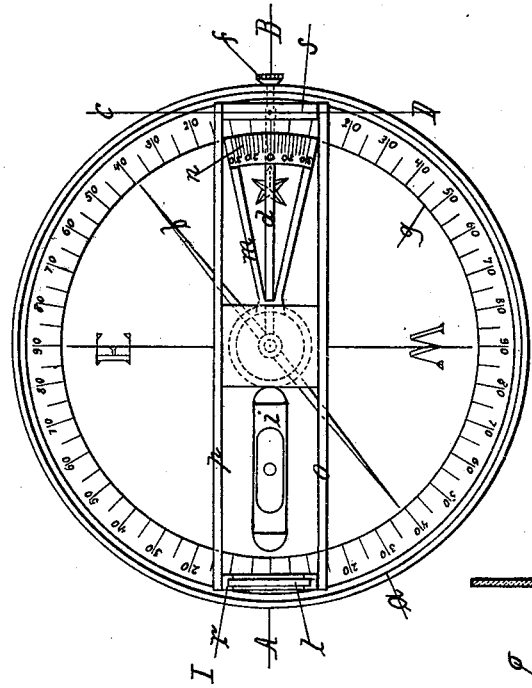
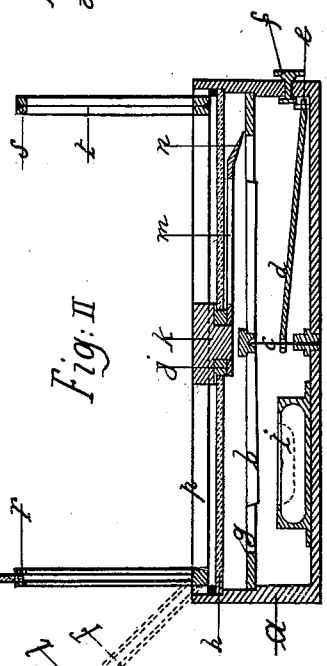
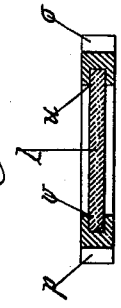
Witnesses
Charles M. Priest
J. H. Copeland
Inventor
Jules A. Birsfield

UNITED STATES PATENT OFFICE.

JULES A. BIRSFIELD, OF DENVER, COLORADO.

FOLDING MINE-TRANSIT.

SPECIFICATION forming part of Letters Patent No. 627,638, dated June 27, 1899.

Application filed February 2, 1899. Serial No. 704,217. (No model.)

*To all whom it may concern:*

Be it known that I, JULES A. BIRSFIELD, a citizen of the United States, residing at Denver, county of Arapahoe, and State of Colorado, have invented a new and useful Improvement in Pocket-Transits, of which the following is a full specification.

The object of this invention is to provide an instrument superior and more reliable than any herein mentioned or known to myself and by which any person skilled in the art of surveying may take sight above and below the horizontal.

In the ordinary surveying-compass provided with folding sights it is not possible to take the reading while looking through the sights at a distant object, and heretofore in order to take compass bearings it has been necessary to provide the instrument with a Jacob's-staff or tripod, so that it could first be sighted upon the object and then the reading of the needle taken, and when used as a hand instrument two observers were required, one to sight the instrument on the object whose bearing was to be taken and the other to take a simultaneous reading of the needle. The simultaneous sighting and reading of a compass can also be attained by an instrument known as a "prismatic" compass; but its use is limited, because said instrument will only take sights on or near a level with the instrument, and the weight of the needle is greatly increased and its accuracy impaired by carrying a large circular card. Again, simultaneous sighting and reading of a compass can be obtained and the readings of both vertical and horizontal angles taken by an instrument known as "Brunton's" pocket-transit, patented September 18, 1894, No. 526,021; but its accuracy is impaired and only indifferent results can be obtained when taking horizontal readings, because the needle of a magnetic compass has no substantial bearing, said needle being mounted on a steel point constantly swinging, and is easily attracted out of its course, according to location of an observer when using said instrument, such as being near mineral (iron) deposits, machinery, or there being a storm, causing electricity in the air.

So far as I am aware no pocket instrument has been produced the combination thereof, as hereinafter specified, enabling to obtain readings both of horizontal and vertical angles with but one vernier and the degree-circle of the compass.

I designate my device a "pocket-transit," having made the instrument small and light enough to be carried in the pocket, and dispense with the use of the Jacob's-staff or tripod.

The instrument comprises a dust-proof casing containing a magnetic compass, a bubble-tube, the combination of an adjustable mirror suitably attached to one of the two adjustable folding sights, said sights suitably hinged to cross-bars, said cross-bars and an arm terminating in a vernier suitably and substantially attached to an axis, the whole rotating by the axis in a bushing, which is cemented substantially in center of glass cover of compass-casing.

I attain the object of my invention by mechanism illustrated in the accompanying drawings, in which in the figures like parts are similarly designated.

Figure I is a top view of entire instrument; Fig. II, a vertical and longitudinal section of said instrument on the line A B of Fig. I, full lines showing instrument when used, first, in taking courses with the needle, and, second, when making a straight line from standing-point fore and aft, dotted lines of the folding adjustable sight and mirror showing the instrument when used for both horizontal and verticle angles; Fig. III, a vertical section on the line C D, showing a view of the sight provided with sight-line; Fig. IV, a horizontal section on the line E F in dotted lines of Fig. II, being an enlarged view of the adjustable folding sight provided with adjustable mirror.

A is the casing, which may be of any material of appropriate character to receive the needle *b* of a magnetic compass, said needle being mounted in the usual manner on a steel point *c* and provided with a locking-lever *d*, which, as here shown, extends to the casing at point *e* and may be operated with a thumb-piece *f*, said thumb-piece projecting through the casing.

*g* is the degree-circle of the compass, suitably divided and subdivided, the drawing in Fig. I showing the circle divided in multiples of five.

$h$ is the cover of the casing, which is, as usual in a compass of glass, suitably and substantially attached to casing, and $i$ is the bubble-tube, commonly known as a "level," suitably and substantially mounted to bottom of casing and parallel to zero-points of the degree-circle $g$.

$j$ is the bushing or bearing cemented or otherwise suitably and substantially mounted in center of glass cover $h$, said bushing $j$ receiving the axis $k$, which is provided below the glass cover with the arm $m$, the said arm terminating in the vernier $n$ and extending to the degree-circle $g$.

$o$ and $p$ are the cross-bars, suitably and substantially attached to the axis $k$ above the glass cover $h$, and provided at opposite ends and suitably hinged thereto are the adjustable folding sights $r$ and $s$, the said sight $s$ provided with the sight-line $t$, which may be of any suitable material commonly known to be in use, as horsehair, and the sight $r$ provided with the grooves $u$ and $v$, said grooves receiving the adjustable mirror $l$.

Some of the uses of this instrument may be stated as follows:

First. The instrument, as shown in Fig. I of drawings, may be used the same as any ordinary compass, the reading taken with the needle.

Second. By placing the folding sights $r$ and $s$ at right angles with the top of the casing, and the mirror adjusted as indicated in full lines in Fig. II of drawings and the instrument held firmly in two hands in a horizontal position at about the height of the eyes, an observer by looking directly through the opening of sights $s$ and $r$ will see an object before him and at the same time in the mirror reflected an object behind, making a straight line without any mechanical movements or adjustments of specified instrument.

Third. By placing the folding sight $s$ again at right angles, as indicated in full lines, and the folding sight $r$ approximately at about one hundred and thirty-five degrees from the top of the casing and the mirror adjusted as indicated in dotted lines in Fig. II of drawings and holding the instrument firmly at about the height of the waist an observer by looking directly down in the mirror will see the object reflected therein in front of him. The instrument may be thus accurately sighted at any object by bringing it in line with the sight-line $t$ and center of mirror, and at same time the vernier reading may be taken accurately by the same observer. Holding thus the instrument in one hand and turning with the other the combination of sights, mirror, and vernier within the axis courses may be taken to objects horizontally at almost any angle and the reading again taken.

Fourth. To take vertical angles, the instrument is held edge up at about the height of the eyes, the level showing zero-points of degree-circle to be horizontal, sights and mirror adjusted the same as in taking horizontal angles. An observer can take or make in same manner courses to objects vertically above or below the horizontal.

Fifth. By varying the position of the folding sight $r$ to any angle suitable, mirror adjusted as indicated in dotted lines of Fig. II of drawings, courses may be taken to objects situated at any angle above or below the horizontal.

Other uses of this instrument will readily suggest themselves to those skilled in the art of surveying; but its general purposes and usefulness as specified are deemed sufficient, and I therefore pray that Letters Patent be granted to me.

I claim as my invention—

1. In an instrument of the character described, the combination of the needle-compass, the level or bubble-glass, the vernier arranged on a central axis, and the folding or hinged sights, one of said sights having a sliding mirror adapted to be projected beyond the normally upper end of said sight, and retractible to permit of the folding of said sight, substantially as specified.

2. In an instrument of the character described, the combination of the needle-compass, the bubble-glass, the parallel cross-bars, the axis depending centrally from said cross-bars, the vernier arranged on said axis below, said cross-bars having a deflected graduated portion, and the hinged or folding sights arranged between said parallel bars, at their ends, one of said sights having a sliding mirror, adapted to be projected beyond the normally upper end of said sight, substantially as set forth.

3. In an instrument of the character described, the combination of the parallel cross-bars, the axis depending centrally from said bars, the vernier arranged on said axis, the graduated compass-circle arranged below said vernier, a transparent plate or portion interposed between said cross-bars and vernier, the bubble-glass, the needle playing in connection with said compass-circle and the hinged or folding sights arranged between said parallel bars, at their ends, and adapted to fold flush with said axis, substantially as set forth.

JULES A. BIRSFIELD.

Witnesses:
 CHAS. M. PRIEST,
 FRANK W. CYCHLAN.